United States Patent [19]

Cosack et al.

[11] 4,137,756

[45] Feb. 6, 1979

[54] HIGH PRESSURE MEMBRANE TEST CELL

[76] Inventors: Claus Cosack, Sudstrasse 8; Wolfgang Hein, Hahnestrasse 9, both of Dassel, Fed. Rep. of Germany, 3354; Nils Hese, Schulstrasse 8, Einbeck, Fed. Rep. of Germany, 3352; Manfred Neumann, Hahnestrasse 7; Wilhelm Willemer, Burggraben 1, both of Dassel, Fed. Rep. of Germany, 3354

[21] Appl. No.: 833,089

[22] Filed: Sep. 14, 1977

[30] Foreign Application Priority Data

Apr. 18, 1977 [DE] Fed. Rep. of Germany ....... 2717047

[51] Int. Cl.² ..................... B01D 25/04; G01N 13/04
[52] U.S. Cl. .................................. 73/64.3; 210/456
[58] Field of Search ................ 73/38, 64.3; 210/23 H, 210/321, 456

[56] References Cited

U.S. PATENT DOCUMENTS

| 2,784,843 | 3/1957 | Braunlich | 210/456 |
| 3,674,152 | 7/1972 | Manjikian | 210/456 |
| 3,721,623 | 3/1973 | Stana | 210/23 H |

FOREIGN PATENT DOCUMENTS 1356012  6/1974  Canada ......................................... 73/38

*Primary Examiner*—S. Clement Swisher
*Attorney, Agent, or Firm*—Fulwider, Patton, Rieber, Lee & Utecht

[57] ABSTRACT

A two-piece body high pressure membrane test cell is disclosed with a tangential feed into the interior pressure chamber in which a central distributor element is mounted with the lower frusto-conical end thereof at a critical spacing above a filter membrane. The membrane is supported on an annular land of a filter support disc which has a peripheral edge zone compressed in a sealed fit between the lower and upper pieces of the cell body. The edge zone is machined to a precise thickness to provide a reproducible and accurate spacing between the filter membrane that rests on the support and the lower end of the distributor.

8 Claims, 1 Drawing Figure

HIGH PRESSURE MEMBRANE TEST CELL

BACKGROUND OF THE INVENTION

1. Field of the Invention

The invention relates to a high pressure membrane test cell of the type and particularly to a test cell having an upper, pressure chamber portion and a lower filter support portion detachably sealed together with a tangential fluid inlet to the pressure chamber and axial outlets from the upper and lower portions for the retentate and permeate respectively.

2. Brief Statement of the Prior Art

A cell of the above-mentioned type for membrane filtration and reverse osmosis has become known in practice. High pressure cells of this type are conventionally operated at pressures in the vicinity of 100 bar.

As compared with other known cells, the cell posesses the advantage of tangential inlet of the medium to be treated into a substantially conical pressure space. A central distributor with a conical foot prevents uneven central impingement of the membrane. The medium flows in a substantially spiral manner in the pressure space and is forced by the foot of the distributor through a narrow annular gap past the outer edge of the distributor foot into a very narrow disc-like space between the lower surface of the foot and upper side of the filter or of the membrane. From this position the medium leaves the pressure space as a retentate and the cell through a discharge duct arranged centrally and axially in the distributor, through a retentate discharge passage out of the cell. The permeate which has passed through the filter and the filter support leaves the cell through a permeate discharge formed in the bottom of the cell.

An important factor for obtaining reliable, reproducible data with this prior art high pressure membrane test cell is that the distance between the lower side of the distributor foot, at least in the marginal zone of the distributor foot, and the suface of the filter or of the membrane, is precisely reproducible for each treatment operation. This distance typically lies in a range of approximately 0.1 to 0.2 mm. This distance should also be precisely adhered to from one cell to another in order to be able to compare results obtained with different cells in a meaningful manner. These conditions are, however, not fulfilled with the prior art cell. Thus, the manufacturing tolerance is thickness of the porous sintered plate, which serves as a filter support, is greater by a facter of ten than the theoretically permitted tolerance of the gap width between the distributor foot and the filter. Furthermore, the distributor is extended in a integral manner through a hole on the top side of the upper part of the twopiece pressure cell and is connected in a sealing manner with the cell by welding. This method prevents any adjustment with the desired degree of accuracy of the relative position of the lower marginal part of the distributor foot. Finally, the upper part and the lower part of the prior art cell are connected in a sealing manner by intermediate rubber seals, which also lead to non-reproducible "drift in" spacing between the upper part and the lower part of the cell and accordingly between the lower edge zone of the distributor foot and the top side of the filter. This in turn causes non-reproducible and unreliable results over an extended period of time with respect to one and the same cell.

BRIEF STATEMENT OF THE INVENTION

In view of this state of the art, the aim of the present invention is that of providing a highly accurate and reproducible distance, corresponding to a predetermined design or ideal distance, between the lower side of the distributor foot, at least in its edge zone, and the upper side of the membrane or of the filter in a high pressure membrane test cell of the aforementioned basic structure which has a tangential inflow of the medium to be treated into the pressure space.

This invention thus creates a two-piece high pressure membrane test cell of the initially described type with tangential feed into the interior pressure chamber and with a central distributor element, and having the critical distance between the lower side of the distributor foot, at least in its marginal zone, and the upper surface of the filter, of the membrane, or of the filter stack, corresponds in a highly accurate and reproducible manner to a pre-established, very small ideal distance. "Reproducible" means in the circumstances indicated one and the same cell corresponds in a highly accurate manner to the pre-established ideal distance even after opening and closing the cell a large number of times and cleaning and replacing parts. However, the word "reproducible" also means in this context that this ideal distance can be adhered to in manufacture from one cell to another in a highly precise manner, something which is an essential condition for comparing the results obtained with different cells in parallel test procedures.

In the invention, none of the abutment annular surfaces which have an influence on the critical distance are constructed as critical sealing surfaces and, in particular, no elastic seal is placed between any of the abutment surfaces determining the critical distance. Additionally, the filter support plate, consisting of porous sintered material, as a rule metal or oxide ceramic material, is supported only in a peripheral edge zone lying outside the free filter surface. This edge zone can be precisely ground without difficulty so that the distance between the upper surface of the filter support and the abutment annular surface on the lower part can be set in a highly precise manner for each individual cell. As a result it is furthermore possible to adhere to the critical gap distance between the foot of the distributor and the filter surface in a highly precise manner.

BRIEF DESCRIPTION OF THE DRAWING

The invention will be described in what follows with reference to one embodiment in conjunction with the FIGURE which shows an embodiment of the invention in axial section.

DESCRIPTION OF THE PREFERRED EMBODIMENT

Figure 1:
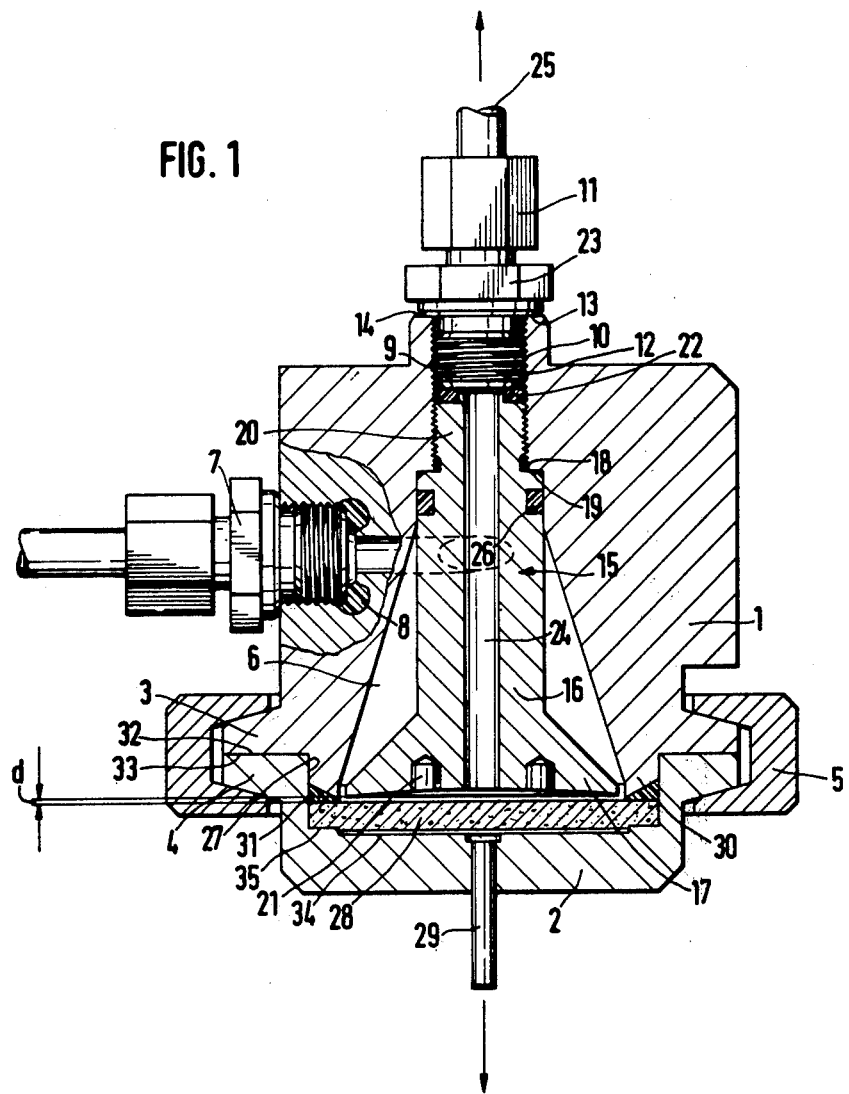

The high perssure membrane testing cell shown in FIG. 1 consists of an upper part 1 and a lower part 2. On the lower side of the upper part 1 a wedge flange 3 is formed while on the upper side of the lower part a wedge flange 4 is formed. The wedge flanges 3 and 4 can be detachably forced together by a conventional trapezoidal tightening ring 5.

The testing cell is made of corrosion-resistant stainless steel for operation of pressures of approximately 100 bar.

In the upper part 1 of the cell a slender pressure chamber 6 of circular, frusto-conical shape is formed, into which the medium to be treated is tangentially injected. The entry of the so-called "feeds" is via a conventional, tangentially aligned passage 7, which opens into the axially upper part of the pressure chamber 6. The passage 7 is sealed off in a fluid-tight manner by a flat sealing means 7a and also by an additional elastic sealing ring 8 at the level of the screw-threaded hole in the upper part 1.

On the top side the upper part 1, which is substantially of cylindrical shape, is a through hole 9 which is open at both ends, and which has a continuous internal screw thread 10. A conventional pressure passage connector 11 of union is screwed into the male thread 10 of the hole 9. This connector serves as a retentate connector. Above its threaded boss 12 the retentate discharge connector 11 has a downwardly directed abutment annular surface 13, which can cooperate with an upwardly facing abutment annular surface 14 formed around the hole 9 on the upper side of the upper part 1.

A distributor 15 is screwed into the threaded hole 9 in the upper part 1 of the cell internally from below. The distributor 15 consists chiefly of a cylindrical section 16 and a substantially conical foot 17. The cylindrical section 16 of the distributor 15 carries an upwardly facing abutment annular surface 18, which cooperates with a corresponding, downwardly facing annular abutment surface 19 in the upper part 1. This surface 19 is formed around the hole 9.

On assembly of the upper part 1, the distributor 15 and the retentate discharge connector 11, firstly the distributor 15 is screwed in internally from below into the hole 9 until flush engagement of the abutment annular surfaces 18 and 19 prevents a further screwing-in of the distributor 15. The torque applied for screwing-in is in this respect so dimensioned that the two abutment annular surfaces 18 and 19 prevents a further screwing-in of the distributor 15. The torque applied for screwing in is in this respect so dimensioned that the two abutment annular surfaces 18 and 19 are just flush and, resting on each other, impede rotary movement without, however, being forced together with a high torque so as to provide a sealing action. The screwing-in operation is preferably carried out by means of plug-in-type torque wrench, whose pins or keys fit into the holes formed at the foot of the distributor 15. After screwing home the distributor 15 the holes, formed in the foot 17, can be closed by plugs 21. Furthermore, after screwing home the distributor 15 into the threaded hole 9 of the upper part 1 a sealing ring 22 is placed from the outside onto the frontal side of the threaded connector boss 12. Finally the retentate discharge passage connector 11 with its threaded boss 12 is screwed from the outside into the thread 10 of the hole 9 until the abutment annular surfaces 13 and 14 lie against each other. The connector 11 is in this case screwed up so tight by means of a hexagonal ring 23 that the annular surfaces 13 and 14 are forced together so as to provide a sealing action withstanding high pressure. In this respect the distance between the abutment annular surface 13 and the frontal side of the threaded connector 12 is so dimensioned that the sealing ring 22, lying between the frontal sides of the threaded connectors 12 and 20, is sufficiently pressure-deformed in order to provide a radial sealing action with respect to the retentate discharge duct 24, formed in a central axial direction in the distributor 15 and the discharge duct 25, formed in the connector 11, and their point of abutment.

The upper end, immediately adjacent to the hole 9, of the pressure space 6, which is in other respects essentially of frusto-conical shape, is preferably constructed with a cylindrical shape in the manner shown in the FIGURE. The diameter of the cylindrical section is so selected that it is just slightly larger than the external diameter of the cylindrical section 16 of the distributor 15. The envelope of the cylindrical section 16 of the distributor 15 has in this respect at this position an annular groove containing an elastically deformable sealing ring 26, which brings about an additional sealing action between the distributor 15 and the upper part 1 with respect to the hole or bore 9.

The foot 17 of the distributor 15 is substantially conical in shape. The lower diameter of the foot 17 is in this respect so dimensioned that it extends radially almost as far as the rim of the free working surface of the filter of the membrane. On its lower side, which can be made slightly concavely curved, the retentate discharge duct 24 opens centrally.

The lower part 2 of the high pressure membrane testing cell has a bowl-like depression 27, whose diameter is larger than the diameter of the working surface, available for the free permeation of material in the cell. In this bowl-like depression 27 the filter support 28, of porous sintered ceramic material and, lying on it (not shown in the FIGURE), the filter or the membrane are fitted with a close fit. Centrally below the filter support 28 a permeate discharge 29 is formed.

Into the bowl-like depression 27 there extends a tapered rim 30 of the upper part 1. The lower frontal edge of the tapered rim 30 is provided with an obliquely outwardly directed face. After the cell has been assembled, the face squeezes a sealing ring 31, lying on the filter, to make sealing engagement both with the filter and also with the cylindrical wall of the bowl-like depression 27. The degree of pressure deformation of the sealing ring 31 is in this respect not determined by the compressibility of the material of the sealing ring 31 but by the flush engagement of the abutment annular surface 32, formed on the lower side of the flange 3, and the abutment annular surface 33 formed on the surface of the annular flange 4.

The free working surface, available for material permeation, of the filter or of the membrane is determined by the internal diameter of the lower edge of the tapered rim 30 of the upper part 1. The bowl-like depression 27 in the lower part 2 of the cell has a central depression 34 with a diameter which is substantially the same as the internal diameter of tapered rim 30. Surrounding the central depression 34, at the rim of the bowl-like depression 27, is an annular land 35 which serves as a support surface for the filter support 28. The filter support surface of the annular land lies outside the free working surface available for material permeation. In the vicinity of the supporting surface of annular land 35 the filter support 28 (which is made slightly thicker than the design size) is precision-machined, more particularly by grinding, in such a manner that the axial distance between the surface filter support 28 and the abutment annular surface 33 on the flange 3 of the lower part 2 corresponds to a predetermined size with a high degree of accuracy. In this respect, it is not of any consequence that on machining away material from the filter support in the vicinity of the annular land 35 the pores of the porous sintered filter support 28 are clogged, since this annular zone only serves for support and is not required for material permeation.

With the high pressure membrane testing cell fitted together in the described manner, it is possible to ensure that the spacing d between the lower side of the foot 17 and upper side of the filter which lies flat on the filter support 28, is maintained with a high degree of precision even after opening and closing the cell a large number of times. Furthermore, this distance d is maintained throughout a production run of cells. This distance d is determined by the abutment surfaces 18 and 19, 32 and 33 and by the upper side of the annular land 35 and the lower side, lying on it, of the filter support 28. Not one of these superficial engagements, having an effect on the critical distance d, serves for sealing purposes of contacts compressed elastic sealing material.

Different filter heights or membrane heights, particularly multi-layer filters, can be precisely allowed for by suitable grinding of the filter support 28. A change from a single layer to a multi-layer filter can be carried out without any difficulty simply by changing from one precisely fitted filter support 28 to another one. The filter supports 28 are, therefore, preferably so fitted or so adjusted to size that on turning over the lower part 2 they just drop out of of the bowl-like depression 27 which is then turned downwards. This type of fit is referred to above as "a close fit".

The bowl-like construction of the lower part 2 ensures at any time a rapid and simple exchange of filters, for which purpose the filter only needs to be placed in a depression without any particular centering of the filter being required in this respect. At the same time it is possible to ensure that the filter or the membrane always makes absolutely flat engagement on the surface of the filter support 28 without being subjected to any sheer forces. The obliquely outward and downward compression of the sealing ring, furthermore, brings about a radially outwardly directed pre-stressing of the membrane or of the filter, which in every case ensures a satisfactory seating of the filter, more particularly in the case of the critical starting up phase of treatment.

In the case of conventional test cell sizes the filter support generally has a thickness of approximately 5.0 mm. This thickness can only be adhered to with a tolerance of ±0.1 mm even in the case of precise manufacture. The critical gap distance between the filter surface and the lower side of the distributor foot should in the optimum working range, however, only amount to 0.1 to 0.2 mm, and preferably 0.15 mm. This distance of preferably 0.15 mm should be adhered to with a tolerance which is not worse than ±0.01 mm. The tolerance required for the gap distance is, therefore, smaller by a factor of ten than the tolerance which can be adhered to for the thickness of the filter support, even in the case of precision manufacture. Subsequent precision plane grinding of the filter support plate is out of the question, since in the case of such grinding the pores of the filter support plate become clogged and the filter support will no longer have the necessary degree of permeability for the permeate.

By the provision of a second depression in the lower part of the cell and by the creation of a peripheral annular abutment zone, which lies without the free filter surface available for treatment, the invention provides the possibility of not using the annular abutment surface for preparation, and of grinding the proud edge, which is available, in such a highly precise manner that the distance between the surface of the filter support and the abutment surface on the lower part of the cell corresponds to a pre-established ideal distance with a high degree of accuracy, that is to say with a degree of precision of better than ±0.005 mm. The fact that on carrying out the precision grinding the pores in the edge zone of the filter support are clogged is of no import since this edge zone in any case lies without the free filter surface. In this peripheral edge surface the sealing action between the upper part, the filter and the lower part by deformation of an elastic sealing ring is also brought about. The latter ring is in this respect so strongly pressure deformed by the edge, which is drawn downwards and fits into the bowl-like depression of the lower part, of the upper part that it provides a sufficient sealing action. In this respect the lower frontal edge of the drawn-down edge of the upper part is conically faced in such a manner that the sealing ring is pressed downwards onto the filter, lying on the filter support, and also radially outwards against the inner cylindrical casing wall of the bowl-like depression in the lower part. It is also of decisive importance in this respect that the degree of pressure deformation of this sealing ring is not limited by the limit of pressure deformality of the material of the sealing ring but by the flush engagement of the flange-like abutment annular surfaces on the lower side of the upper part and the upper side of the lower part. The axial distance between the lower part and the upper part of the cell is accordingly not determined by the possibility of pressure deformation of a sealing material but by the flush engagement of abutment sealing surfaces.

The same basic idea of constructing abutment surfaces for longitudinal adjustment separately from the required sealing surfaces is adopted also in the case of the upper passage of the distributor, which simultaneously serves as a retentate discharge. The distributor head has its male screw thread screwed into the female thread of the passage holes to such an extent that the annular abutment surfaces constructed on the distributor as a shoulder and around the hole of the upper part of the cell as a recess about against each other in a precisely flush manner. The relative axial position of the distributor in the upper part can accordingly be fixed in a highly precise manner by exact plane grinding of the abutment annular surfaces. These abutment annular surfaces on the inner side of the upper part and on the distributor do not serve as sealing surfaces. They do, therefore, not need to be forced together in a sealing manner either, something which would prevent removal of material. The actual surface sealing action for this retentate discharge passage with respect to the pressure space of the cell occurs at the outer abutment annular surface of the cell, which cooperates with the corresponding abutment annular surface of the connector screwed in from the outside. This connector can be pushed with a high force in a sealing manner onto the cell. After any damage by excessively forceful tightening-up these sealing surfaces can also be remachined by the user himself as well without the geometric position of the cell being impaired as a result. The frontal seal between the elements screwed from both ends into the passage hole of the upper part of the cell, that is to say between the distributor and the retentate discharge duct formed in it, on the one hand, and the discharge connector on the other hand, is ensured by an elastic sealing ring which is placed between the mutually adjacent frontal surfaces and which is pressure-deformed to a sufficient extent when the elements are screwed home in the required manner in order to provide a radial sealing around the retentate discharge duct at the position of abutment.

What is claimed is:

1. A high pressure membrane test cell comprising:
   (1) an upper cell part having a central axial hole bearing internal screw threads communicating with an internal pressure chamber with an annular shoulder therebetween and an annular flange surface on its undersurface;
   (2) a tangentially aligned medium supply passageway opening into the upper portion of said pressure chamber beneath said axial hole;
   (3) a distributor received within said pressure chamber having a cylindrical neck threadably engaged in said axial hole, an internal axial passageway in communication therewith and an annular shoulder engaged against the annular shoulder of said upper part in direct contact therewith to provide a precise axial positioning of said distributor in said chamber;
   (4) an externally threaded conduit engaged in said axial hole and extending exteriorly of said cell; said conduit sealable engaged within said hole and against the end of said distributor received in said axial hole; and
   (5) a lower cell part detachable secured to said upper cell part and providing support means to position a filter between said pressure chamber and the lower end of said distributor with an annular flange surface abutting said annular flange of said upper cell part in direct contact therewith to provide a precise predetermined distance between the undersurface of said distributor and the upper surface of said membrane.

2. The test cell of claim 1, wherein said lower cell part has a central depression surrounded by an annular precisely ground land on which is supported a permeable membrane filter support.

3. The test cell of claim 2, wherein said filter support is a sintered ceramic disc.

4. The test cell of claim 3, wherein the outer periphery of said ceramic disc is ground to a predetermined thickness to provide a precise axial spacing of said filter support from the lower end of said distributor.

5. The test cell of claim 4 wherein said distributor has a fustro-conical lower end.

6. The test cell of claim 4, wherein said upper part has an outwardly beveled lower edge.

7. The test cell of claim 6, wherein a compressible seal is engaged between said beveled lower edge of said upper part and an annular portion of said filter support.

8. The test cell of claim 1 wherein the undersurface of said distributor has a concavely arcuate contour.

* * * * *